H. A. HOESCHEN.
MOTOR.
APPLICATION FILED JUNE 17, 1909.
999,562.
Patented Aug. 1, 1911.
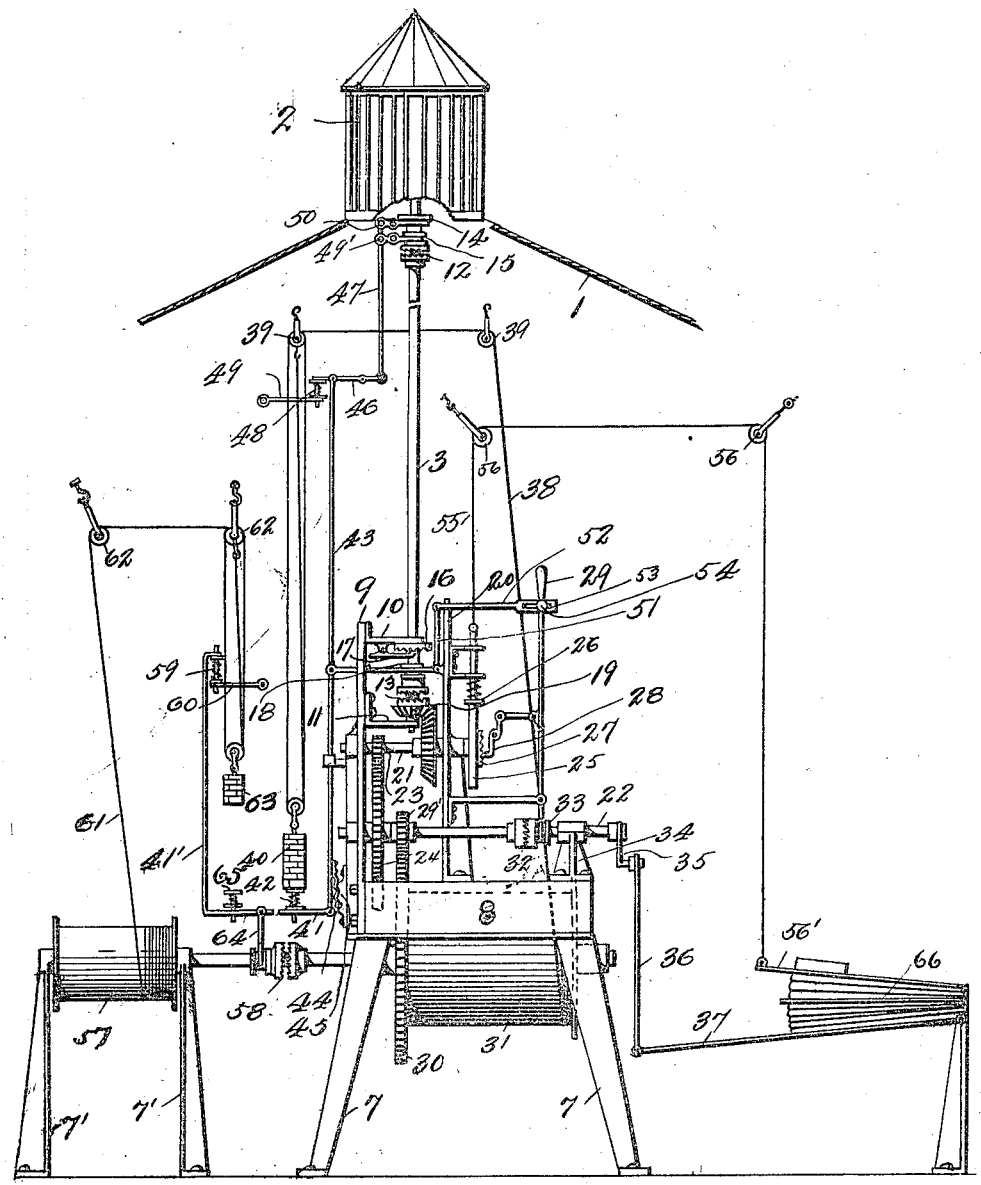
WITNESSES
INVENTOR
Henry A. Hoeschen
By _____ Attorney

UNITED STATES PATENT OFFICE.

HENRY A. HOESCHEN, OF OMAHA, NEBRASKA.

MOTOR.

999,562. Specification of Letters Patent. Patented Aug. 1, 1911.

Application filed June 17, 1909. Serial No. 502,745.

*To all whom it may concern:*

Be it known that I, HENRY A. HOESCHEN, a citizen of the United States, residing at Omaha, in the county of Douglas and State of Nebraska, have invented certain new and useful Improvements in Motors, of which the following is a specification.

My invention relates to improvements in motors, and has particular reference to a weight motor adapted to be wound by air currents impinging against a wind wheel connected with said motor.

The leading object of the invention is the provision of a motor especially adapted for furnishing air and pumping the same into organ pipes which will be simple of construction, economical of operation, easily controlled, and thoroughly efficient in every particular.

A further object of the invention is the provision of an improved weight motor adapted to be wound by air currents impinging against a wind wheel connected with the motor and which mechanism will automatically throw the wind wheel into operative gear with the motor to wind the same when the motor is nearly run down and which will automatically throw the wind wheel out of gear when the motor is wound.

To attain the desired objects, my invention comprises a drum having a cable wound thereon, a gear carried by the drum, gearing in mesh therewith, a weight suspended by the cable and unwinding the same to drive the drum and gearing, and a wind wheel connected by a clutch with the gearing to drive the same in a reverse direction to wind the cable on the drum, and means for automatically throwing said wind wheel into and out of operative engagement with the gearing, the invention further residing in the novel features and combination and arrangement of parts substantially as hereinafter described and as illustrated in the accompanying drawing.

The figure represents a side elevation of my complete mechanism.

In the drawings, the numeral 1 designates the roof of the building, on which is mounted the wind wheel casing 2 into which extends the vertical shaft 3 bearing a suitable wind wheel on its upper end adapted to be driven by the air currents to rotate the shaft 3.

Secured to the floor of the building under the wind wheel, I place the frame of my device, comprising the legs 7 bolted or otherwise secured to the floor, and secured thereto the frame proper 8 having on one side the upright extension 9 bearing the brackets 10 and 11 in which the lower end of the shaft 3 is journaled. The said shaft 3 is made in two parts, said parts being operatively connected by means of the ratchet clutch 12, while the clutch 13 operatively connects the shaft with the beveled gear 19 for driving the latter. On the upper section below the wheel is secured the brake wheel 14 and the collar 15, while the lower section has secured thereon the toothed or ratchet wheel 16, engaged by the dog 17 pivotally secured to the bracket 10 and suitably held in engagement with the teeth of the wheel. Mounted below said wheel 16 is the sliding collar 18 and the beveled gear wheel 19 having on its upper or plain face one of the halves of the clutch 13.

Journaled in the extension 9 and a second extension 20 are the two parallel horizontal shafts 21 and 22. The shaft 21 bears a beveled gear wheel which intermeshes with the beveled gear 19 on the vertical shaft and has the spur wheel 23 which engages the gear wheel 24 on the shaft 22 for driving the same. On the outer end of the shaft 21 is the balance wheel 25, having the spring pressed brake 26 bearing against its periphery, while its outer face has formed thereon the circularly disposed projecting teeth 27 engaged by the pawl 28 controlled by the hand lever 29 for locking said wheel and thus the shaft 21 in motionless position.

The shaft 22 is provided in addition to the driving gear 24, with the spur wheel 29' which engages and drives the gear wheel 30 secured to the drum 31 and turning the same. The exterior portion of said shaft bears the ratchet clutch 32 having the sliding collar 33, and said outer end is journaled in the additional bearing 34 projecting from the frame 8, and on the end of the shaft 22 is secured the cranked lever 35 joined by means of the pitman 36 with the arm of the bellows 37, the revolution of the shaft 22 with its crank 35 serving through the pitman 36 to raise and lower the arm 37 by swinging it on its pivot, said arm 37 serving to pump air into the bellows. As the revolution of the shaft through the medium of the lever 35 and pitman 36 operates the bellows, it at the same time by means of the spur 29 and the gear 30 revolves the drum 31, the revolution thereof winding thereon the cord or rope 38 which passes over a series of sheaves 39, the winding of said cord 38 serving through the arrangement of said pulleys 39 to raise the weight 40.

To prevent the overwinding and thus the destruction of said cord 38, I provide the automatic releasing mechanism comprising the pivoted base lever 41 bearing the spring pressed buffer 42 and having secured to one end the vertical rod 43, said rod 43 being slidably secured in a bracket on the extension 9 and having near its lower end the serrated flat spring member 44 which engages a toothed plate 45 on the frame and holds the said rod in adjusted position and prevents the accidental displacement thereof, the buffer 42 absorbing the shock of the weight contacting with the lever 41, and the pressure of the weight on the said lever 41 depressing said lever and thus the rod 43.

Pivoted to the upper end of the rod 43 is the lever 46, pivotally secured intermediate its length to the wall or other suitable stationary support and having its opposite end engaged by the upright rod 47, pivotally secured thereto. The end of the lever 46 adjacent to the rod 43 normally rests upon the buffer 48 mounted on the suitably secured pivoted arm 49, said arm serving to operate the lever 46 when forced upward.

To the upper portion of the rod 47 are pivotally secured a pair of intermediately pivoted levers or arms 49' and 50, the arm 49' engaging the collar 15 of the clutch 12 and serving to throw the clutch out of operation, while the arm 50 bears against the brake wheel 14 and holds the wind wheel and shaft motionless when the clutch is thrown out of operation.

To enable the user of my device to easily control the operation thereof, I provide the bell crank lever 51 pivoted to ears on the extension 20, the end of one of the arms of said lever being connected by means of the pivoted bar 52 with the hand lever 29, said bar 52 having a slot 53 formed in its outer end in which the connecting pin 54 on the hand lever has a sliding movement. The other arm of the bell crank lever 51 has its outer end pivoted to the rod 43, and engages intermediate its length the collar 18 and serves to slide said collar and thus throw the clutch 13 out of engagement or into engagement when moved either by the operation of the hand lever or the rod 43, the clutch 13 serving to connect the wind motor with the gearing and to disconnect it therefrom. The said hand lever 29 is pivotally secured to a bracket on the extension 20 and has its lower end engaging the collar 33 of the clutch 32, thus disconnecting the pump driving apparatus from the driving mechanism, this being accomplished without disturbing the other clutches on account of the pin 54 sliding in the slot 53 of the bar 52, while if it is desired to stop the entire device it is merely necessary to throw the lever 29 farther, when the pin engages the end of the slot and operates the bell crank lever 51, said lever in turn transmitting motion to the other levers and thus throwing the clutches 12 and 13 into or out of engagement, the hand lever when throwing said clutches out of engagement also causing the pawl 28 to engage the teeth 27 on the wheel 25 and prevent the movement thereof, it being possible however, on account of the sliding connection between the hand lever and bell crank lever to throw said pawl out of engagement and the clutch 32 into engagement without disturbing the remainder of the mechanism.

It will be understood that while my device may be manually controlled, it is particularly adapted to automatically operate and be self controlling, the only necessary manual operation being that of the clutch 32 and the pawl 28. In the manual operation of my device the rod 43 is moved by the bell crank lever 51 while when automatically controlled the weight 40, resting on the buffer 42 forces the lever 41 downward, thus moving the rod 43 and all other levers connected therewith and throwing the clutches 12 and 13 into engagement and releasing the brake wheel 14, allowing the wind wheel, shaft, and gears to turn and thus wind the cord 38 on the drum 31, raising the weight. When the weight 40 has been raised upward a sufficient distance, it is brought into contact with the arm 49 which by bearing against the lever 46 moves the rod 43 and all the connected levers in a reverse direction, throwing the clutches 12 and 13 out of engagement, the weight 40 then, unless prevented by the setting of the lever 29 to cause the pawl to hold the shafts motionless causing the cord to unwind and turn the drum which in turn through the medium of the intermeshing gears revolves the horizontal shafts and drives the pumping mechanism or bellows 66, the lower end of the shaft 3 being held motionless by the engagement of the dog 17 with the toothed wheel 16.

To prevent the too rapid operation of the motor and thus the pumping of an undue amount of air into the bellows, I provide the spring pressed brake 26, said brake bearing against the balance wheel 25 but being held out of contact therewith by means of the cord 55 which passes over a series of pulleys 56 and has its free end connected to the upper arm 56' of the bellows, said arm 56' by undue pressure of the air being forced upward, which motion releases the tension on the cord 55 and premits the brake 26 to be pressed against the balance wheel with the full force of the spring thus materially retarding the speed of the revolution thereof.

At the left of Fig. 1, I have illustrated an auxiliary attachment for my motor which may be used for winding a clock or for any other suitable purpose, said device consisting of the drum 57 having its shaft journaled in the supporting legs 7', said shaft being operatively connected to the shaft of the drum 31 by the ratchet clutch 58, said clutch being operated by the swinging of the downwardly projecting lever arm 64 on the base portion of the angular lever 41'. Said lever 41' has an arm extending upward from the base at right angles and has secured to the upper end thereof the spring pressed buffer 59, said buffer extending downward and having bearing thereagainst the suitably secured pivoted lever 60. In operation, the ratchet clutch 58 being in connection, the revolution of the drum 31 causes the drum 57 to revolve and wind thereon the cord 61 which passes over a series of sheaves 62 and raises the weight 63. When this weight 63 comes into contact with the lever 60 it forces it upward into contact with the buffer 59 and by forcing it upward causes the lever 41' to move and its arm 64 to swing to the left, thus throwing the clutch 58 out of engagement. The drum 57, being no longer driven by the shaft of the drum 31 is rotated by the unwinding of the cord 61 until the weight 63 comes to rest upon the buffer 65 on the lever 41'. The pressure of the weight on said lever causes it to swing in a reverse direction, the clutch 58 being again thrown into engagement and the operation repeated.

In operation, the wind wheel is connected by means of the clutches of the shaft 3 with the various gearing and serves through the medium thereof to wind the cable or cables 38 and 61 and thus to elevate the weights of the cables. As the weight rises to its uppermost or highest point it engages the abutment 49' and shifts the vertical sliding rod and also the member 47 to throw the wind wheel out of engagement with the lower portion of the shaft. The descent of the weight unwinds the cable from the drum and thus causes the drum to rotate and drive the gearing in the opposite direction from that in which it is driven by the wind wheel. In either instance, however, the shaft 22 is rotated and thus its crank arm 35 which through the link 36 imparts a rocking movement to the lower arm of the air pump or bellows 66, the movement of said arm 37 of the bellows being the same whether driven by the weight operated drum or by the wind wheel. As the cable is almost unwound the weight engages a second abutment to shift the vertical sliding rod in the opposite direction and thus again throw the wind wheel into operation to rewind the cable on the drum.

From the foregoing description taken in connection with the drawings the construction and operation of my improved motor will be readily understood and its advantages be fully appreciated, and it will be seen that I provide a simple, durable and efficient motor which has no expense of operation and which will commend itself to all as a highly desirable mechanism for the intended purpose.

I claim:

A power storing device comprising a frame, a drum rotatably mounted therein, a cable wound on the drum, a weight supported by the cable, a reciprocatory rod, spring actuated buffers at opposite ends of the rods between which said weight moves, a vertically disposed shaft, clutch mechanism actuated by the reciprocation of said rod for controlling the movement of the shaft, an angle lever, a depending swinging member thereon, a clutch member actuated by the latter, spring actuated buffers carried by the vertical member of said angle lever, a drum, a cord wound thereon, and a weight supported by said cord for coöperation with the spring actuated buffers on said angle lever.

In testimony whereof I affix my signature, in presence of two witnesses.

HENRY A. HOESCHEN.

Witnesses:
J. W. MARTIN,
C. M. HICKMAN.